Patented Mar. 14, 1944

2,343,950

UNITED STATES PATENT OFFICE 2,343,950

STABILIZATION OF VINYL ESTERS

Allan Berne-Allen, Jr., Waynesboro, Va., assignor to E. I. du Pont de Nemours & Company, Wilmington, Del., a corporation of Delaware No Drawing. Application February 18, 1942, Serial No. 431,451

6 Claims. (Cl. 260—488)

This invention relates to the stabilization of vinyl esters against polymerization, and more particularly to the stabilization of vinyl acetate.

Vinyl esters such as vinyl acetate spontaneously polymerize on standing at room temperature and it has been customary to add thereto a small amount of an agent during or after the final rectification to maintain the vinyl esters in the monomeric state during storage and transfer. When the vinyl ester is to be used, it is freshly distilled to free it from the polymerization inhibitor and then immediately used before any substantial undesirable polymerization takes place.

However, none of the agents heretofore employed in vinyl esters or in vinyl ester-bearing liquors to inhibit polymerization has proven entirely satisfactory. Some of the so-called inhibitors are not sufficiently effective in small quantities; others, as for instance sulfur, corrode the copper equipment ordinarily used in subsequent operations and/or are only slightly soluble in vinyl esters and, on evaporation of the vinyl ester, the stabilizing agents may cause stoppage within the still or be removed from the still-kettle only with difficulty; still others, copper resinate for example, may introduce an undesirable ion (copper) into the manufacturing system, thereby introducing the possibility of inadvertently forming copper acetylide should the copper ion come in contact with acetylene under suitable conditions of pH and moisture.

An object of this invention, therefore, is to provide a class of polymerization inhibitors for vinyl ester compositions, which are highly efficient in their action, which do not corrode the apparatus, which do not operate to introduce undesirable impurities into the manufacturing system, and which are stable under the conditions of operation.

A further object is to provide polymerization inhibitors particularly adapted for use in vinyl acetate and vinyl acetate-bearing liquors.

A still further object is in the provision of stabilized vinyl ester monomer compositions which can be stored for long periods of time without undergoing substantial polymerization.

The above stated and other objects will more clearly appear from the following description.

These objects are accomplished by my invention which, briefly stated, comprises the addition of a small amount of an anhydrous ammonium salt of an organic acid, and especially of the simple carboxylic aliphatic and aromatic acids such as acetic and benzoic acids, to vinyl esters and vinyl ester-bearing liquors as a polymerization inhibitor.

As examples of specific compounds falling within the class of compounds useful in my invention, are the following: anhydrous ammonium salts of acetic, propionic, butyric, formic, resinic, benzoic, lactic, citric, and phthalic acids.

Only a very small amount of the anhydrous ammonium salt need be used to give a marked improvement in stability; for instance, the preferred range of concentration, in general, is between 0.01% and 0.3% by weight of the vinyl ester monomer.

To further illustrate this invention the following specific example is given. Parts are by weight.

*Example*

0.1 part of fused anhydrous ammonium acetate was added to 100 parts of rectified vinyl acetate monomer. This sample and a control were refluxed simultaneously for three hours, at the end of which time the control showed 10.6% polymer by weight, while the stabilized sample showed only 0.1% polymer (polymer percentage was determined by evaporating a weighed sample to dryness and weighing the residue).

While my invention has been specifically described in connection with the stabilization of vinyl acetate, it is not so limited but is applicable as well to the stabilization of vinyl esters other than vinyl acetate, for example, vinyl propionate, vinyl butyrate, etc. Furthermore, the invention is applicable not only to the stabilization of monomeric vinyl esters against polymerization, but may also be used to inhibit further polymerization of partially polymerized vinyl esters.

While anhydrous ammonium salt may be added to the vinyl ester or vinyl ester-bearing liquor at any stage in the manufacturing process, it is especially useful during the final stages of rectification and also in stabilizing a vinyl ester that has previously been rectified, until its time in storage, transit, etc., is over.

I claim:

1. The process which comprises adding an anhydrous ammonium salt of an organic acid to a vinyl ester-containing composition whereby to inhibit polymerization of the vinyl ester.

2. The process which comprises adding to a vinyl ester-containing composition from about 0.01% to about 0.3% by weight, based on the weight of the ester, of an anhydrous ammonium salt of an organic carboxylic acid whereby to inhibit polymerization of the vinyl ester.

3. The process which comprises adding to monomeric vinyl acetate from about 0.01% to about 0.3% by weight, based on the weight of vinyl acetate, of an anhydrous ammonium salt of an organic carboxylic acid.

4. A vinyl ester stabilized with an anhydrous ammonium salt of an organic carboxylic acid.

5. A monomeric vinyl ester stabilized with from about 0.01% to about 0.3% by weight based on the weight of vinyl ester, of an anhydrous ammonium salt of an organic carboxylic acid.

6. Vinyl acetate stabilized with from about 0.01% to about 0.3% by weight based on the weight of vinyl ester, of an anhydrous ammonium salt of an organic carboxylic acid.

ALLAN BERNE-ALLEN, Jr.